US012554763B2

(12) United States Patent
Engi et al.

(10) Patent No.: US 12,554,763 B2
(45) Date of Patent: Feb. 17, 2026

(54) USING A KNOWLEDGE GRAPH TO DETERMINE RE-PROMPTS IN A RETRIEVAL-AUGMENTATION GENERATION (RAG) FRAMEWORK

(71) Applicant: Cisco Technology, Inc., San Jose, CA (US)

(72) Inventors: Derek William Engi, Pleasant Ridge, MI (US); Bradley Michael Wise, Jersey City, NJ (US); M. David Hanes, Lewisville, NC (US); Vivek Kumar Singh, Cary, NC (US); Ambrose D. Taylor, Durham, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/797,802

(22) Filed: Aug. 8, 2024

(65) Prior Publication Data

US 2025/0371066 A1    Dec. 4, 2025

Related U.S. Application Data

(60) Provisional application No. 63/653,377, filed on May 30, 2024.

(51) Int. Cl.
*G06F 16/30* (2019.01)
*G06F 16/332* (2019.01)
*G06F 16/383* (2019.01)

(52) U.S. Cl.
CPC ........ *G06F 16/383* (2019.01); *G06F 16/3325* (2019.01)

(58) Field of Classification Search
CPC ............................ G06F 16/383; G06F 16/3325
See application file for complete search history.

(56) References Cited

U.S. PATENT DOCUMENTS 10,459,989 B1    10/2019 Haahr et al.
12,020,140 B1 *   6/2024 Mondlock ............ G06N 3/0455
(Continued)

FOREIGN PATENT DOCUMENTS

CN        117708308 A       3/2024

OTHER PUBLICATIONS

Chan C-M., et al., "RQ-RAG: Learning to Refine Queries for Retrieval Augmented Generation", arXiv:2404.00610v1, Mar. 31, 2024, 18 Pages.

(Continued)

*Primary Examiner* — Kristopher Andersen
(74) *Attorney, Agent, or Firm* — Edell, Shapiro & Finnan, LLC

(57) ABSTRACT

According to one aspect, a method includes obtaining, at an interface to a system that includes a large language model (LLM) arrangement, a first prompt, and identifying a plurality of candidate chunks of documents that substantially match the first prompt. The method also includes analyzing the plurality of candidate chunks to identify a chunk node associated with the plurality of candidate chunks, and generating a query arranged to solicit information associated with the plurality of candidate chunks. A second prompt is obtained in response to the query, and the plurality of candidate chunks is analyzed. Analyzing the plurality of candidate chunks using the second prompt includes identifying at least a first candidate chunk of the plurality of candidate chunks that is associated with the second prompt, wherein the first candidate chunk has a context. Finally, the method includes generating a response to the first prompt using the context.

20 Claims, 12 Drawing Sheets

(56) References Cited

U.S. PATENT DOCUMENTS

| | | | | |
|---|---|---|---|---|
| 12,282,504 B1* | 4/2025 | Ganesh | ................ | G06F 16/35 |
| 2023/0376537 A1 | 11/2023 | Bansal et al. | | |
| 2025/0111192 A1* | 4/2025 | Bayless | ................ | G06N 3/006 |

OTHER PUBLICATIONS

Hu Z., et al., "Prompt Perturbation in Retrieval-Augmented Generation Based Large Language Models", arXiv:2402.07179v1, Feb. 11, 2024, pp. 1-12.

Kuan J., "From RAGs to Riches: Helping AI Connect the Dots with a Knowledge Vector Graph", Medium, Jan. 1, 2024, Retrieved from https://medium.com/@johnson.h.kuan/from-rags-to-riches-helping-ai-connect-the-dots-with-a-knowledge-vector-graph-f9e8f91b06a4 on May 16, 2024, pp. 1-13.

Wiebeler A., et al., "Improve LLM Responses in RAG Use Cases by Interacting with the User", AWS Machine Learning Blog, Nov. 13, 2023, Retrieved from https://aws.amazon.com/blogs/machine-learning/improve-llm-responses-in-rag-use-cases-by-interacting-with-the-user/ on May 16, 2024, pp. 1-9.

Wiebeler A., "Leveraging the User to Improve Agents in RAG Use Cases", Github, aws-samples/rag-with-human-support, Retrieved from https://github.com/aws-samples/rag-with-human-support/tree/main on May 16, 2024, pp. 1-5.

* cited by examiner

USING A KNOWLEDGE GRAPH TO DETERMINE RE-PROMPTS IN A RETRIEVAL-AUGMENTATION GENERATION (RAG) FRAMEWORK

PRIORITY CLAIM

This patent application claims the benefit of priority under 35 U.S.C. § 119 to U.S. Provisional Patent Application No. 63/653,377, filed May 30, 2024, and entitled "USING A KNOWLEDGE GRAPH TO DETERMINE RE-PROMPTS IN A RETRIEVAL-AUGMENTATION GENERATION (RAG) FRAMEWORK," which is incorporated herein by reference in its entirety.

TECHNICAL FIELD

The present disclosure relates to the utilization of chatbots.

BACKGROUND

A Retrieval-Augmentation Generation (RAG) framework is an artificial intelligence (AI) framework for improving the quality of Large Language Model (LLM) generated responses. Implementing RAG in an LLM-based question answering system generally ensures that an LLM has access to the most current information, and that users have access to the model's sources, ensuring that its claims can be checked for accuracy and can be trusted.

In a RAG framework, auxiliary documentation not necessarily used during the training of a LLM is used to provide additional context when answering prompts provided by a user. One issue with RAG is that a prompt submitted by a user may match several documents or chunks of documents, and choosing the "most similar" does not always ensure the "best" context is used when querying an LLM. Thus, there is an opportunity for a method that provides an ability for improving the context used when querying an LLM.

DESCRIPTION OF EXAMPLE EMBODIMENTS

Overview

Figure 1:
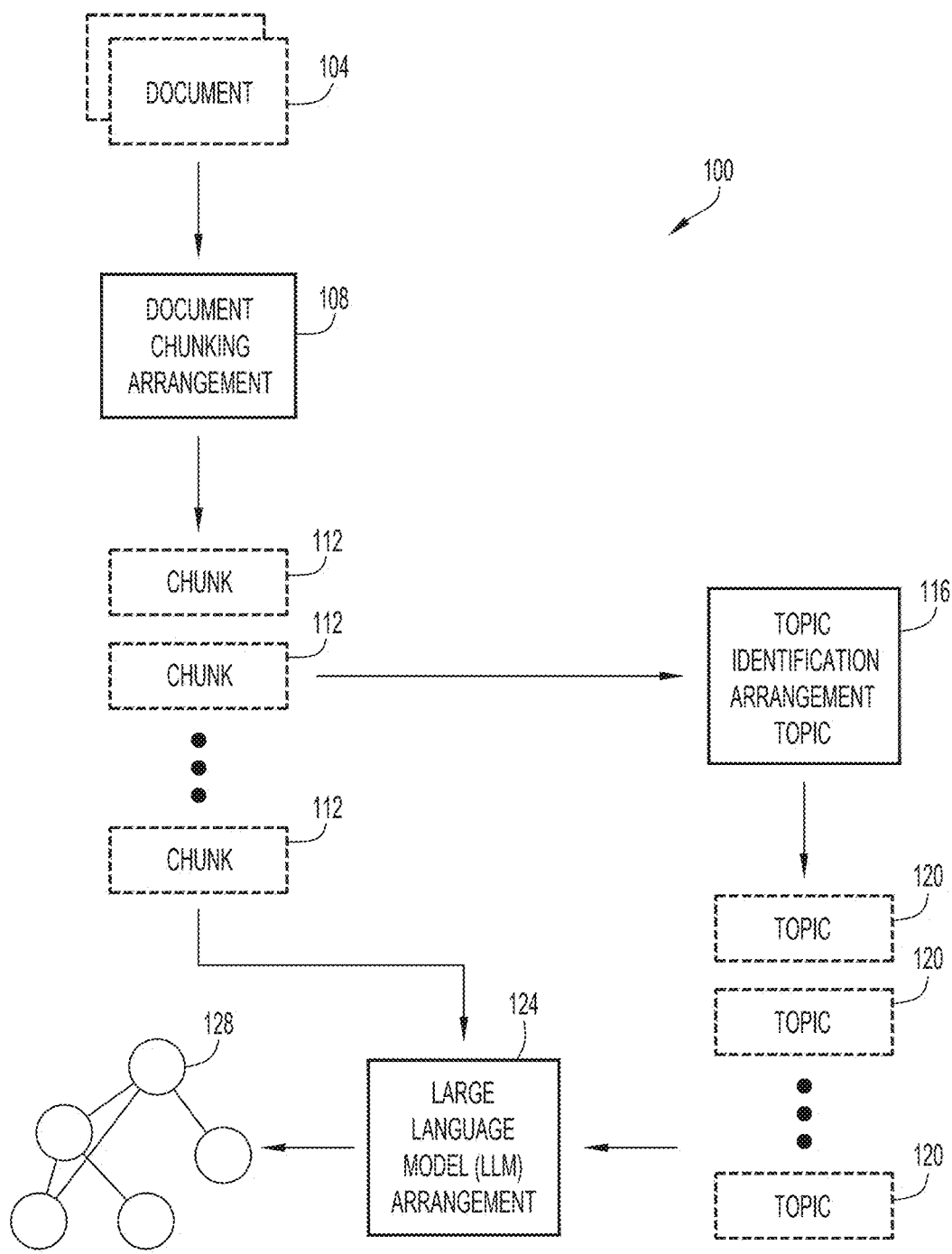
FIG. 1 is a diagrammatic representation of an overall system which enables a knowledge graph to be created in accordance with an embodiment.

In one embodiment, a method includes obtaining, at an interface to a system that includes a large language model (LLM) arrangement, a first prompt, and identifying a plurality of candidate chunks of documents that substantially match the first prompt. The method also includes analyzing the plurality of candidate chunks to identify a chunk node associated with the plurality of candidate chunks, and generating a query arranged to solicit information associated with the plurality of candidate chunks. A second prompt is obtained in response to the query, and the plurality of candidate chunks is analyzed. Analyzing the plurality of candidate chunks using the second prompt includes identifying at least a first candidate chunk of the plurality of candidate chunks that is associated with the second prompt, wherein the first candidate chunk has a context. Finally, the method includes generating a response to the first prompt using the context.

Presented herein are techniques to improve the Retrieval-Augmented Generation (RAG) framework by identifying ideas or clarification text in documents that may be used to obtain clarification from a user before selecting appropriate context for processing by a Large Language Model (LLM). This allows the most relevant documents with respect to a prompt or query provided by a user to be identified. The clarification may be solicited from a user by a chatbot through posing clarifying questions to re-prompt the user.

Example Embodiments

A Retrieval Augmented-Retrieval (RAG) framework is an artificial intelligence (AI) technique that allows AI models to obtain or retrieve information from a knowledge source and to provide the information to a large learning model (LLM) to generate text in answer to a prompt, or an instruction. In a standard RAG framework, documents are "chunked" into snippets of a predetermined size, embeddings are converted into a vector, and the vector is archived in a data store. When a user asks a question or provides a prompt to the RAG framework, cosine similarity or other evaluations determine which chunks of documents are close matches to the prompt from the user, and returns the chunks to provide an external Large Language Model with more context relative to the question or prompt. Typically, multiple chunks may be returned, and the returned chunks may contain conflicting or otherwise inconsistent information. As such, an ability to determine whether a user may be asked a follow-up question to provide additional information that may enable returned chunks with consistent information to be identified for further processing. A system may enable a user to provide a follow-up prompt that may be processed by a software application or interface that effectively simulates human conversation through text or voice interactions, e.g., a chatbot, in addition to context and an initial prompt provided by the user, to essentially provide an appropriate, or consistent, response to the initial prompt.

RAG frameworks may be improved by learning the structure and content of auxiliary documentation that is used as context. The automation of the creation of a knowledge graph may enable ideas and topics to be linked to chunks of auxiliary documents in a RAG framework. The calculation of pathways and relationships between candidate chunks determined by text similarity of a user provided initial prompt, in addition to the identification of central ideas or topics that relate candidate chunks in a knowledge graph, enables clarifying queries or questions to be formulated or otherwise identified. As will be appreciated by those skilled in the art, a knowledge graph is a knowledge base or data cluster that includes a directed label graph in which meanings, e.g., domain-specific meanings, are associated with nodes and edges which A clarifying query may effectively solicit additional information from the user, e.g., a response from the user such as a follow-up prompt or a re-prompt, based on a relationship between a central idea associated with an initial prompt and the node or idea paths terminating at a candidate chunk. A candidate chunk may be chosen based on additional context provided in a response from a user to a query based on graph traversal and connectivity metrics. As a result, a user may be provided with an appropriate, e.g., accurate and on point, response to the initial prompt.

In one embodiment, a method of providing a response to a user prompt uses an additional LLM to construct a knowledge graph of the ideas and contextual proximity of thoughts or contents in the documents and chunks provided to a system that includes an augmented RAG framework as context after the system effectively identifies additional information to request from the user. The user may provide a subsequent, follow-up prompt or re-prompt in response to the request. The knowledge graph associates topics and keywords in the document to individual chunks based on, for example, a chunkID and an interrelation of topics to each other. A knowledge graph may be created through effectively requesting that an LLM repeatedly scrutinize or otherwise process a set of documents to evaluate the content of the documents, linking ideas to chunks, and documents to ideas. As such, a knowledge graph is created by the LLM based on the chunks.

FIG. 1 is a diagrammatic representation of an overall system which enables a knowledge graph to be created in accordance with an embodiment. An overall system 100 includes a document chunking arrangement 108, a topic identification arrangement 116, and a LLM arrangement 124. Document chunking arrangement 108, topic identification arrangement 116, and LLM arrangement 124 may each include hardware and/or software logic, and generally cooperate to create a knowledge graph 128. The software logic may include instruction encoded on a non-transitory computer readable medium.

A document 104 may be provided as input, or otherwise ingested by, document chunking arrangement 108. Document chunking arrangement 108 creates a plurality of chunks 112 from document 104. Chunks 112 may generally include snippets of text, and the size of the snippets may vary widely. The plurality of chunks 112 may be provided as input to topic identification arrangement 116 which is arranged to identify one or more topics 120, or ideas, associated with chunks 112. Topic identification arrangement 116 processes chunks 112 to determine the substance of chunks 112, or to evaluate the content of chunks 112, and essentially extracts ideas or topics from chunks 112. It should be appreciated that extracting one or more ideas or topics 120 from chunks 112 effectively serves to identify the ideas or topics associated with document 104.

In one embodiment, chunks 112 and one or more topics 120 are provided as input to LLM arrangement 124 such that LLM arrangement 124 may construct a knowledge graph 128 based on one or more topics 120 and contextual proximity of concepts in documents 104 and chunks 112. That is, chunks 112 and topics 120 may be provided as context to LLM arrangement 124 such that knowledge graph 128 may associate one or more topics 120 to chunks 112 based on a chunkID and how one or more topics 120 are related to each other.

Figure 2:
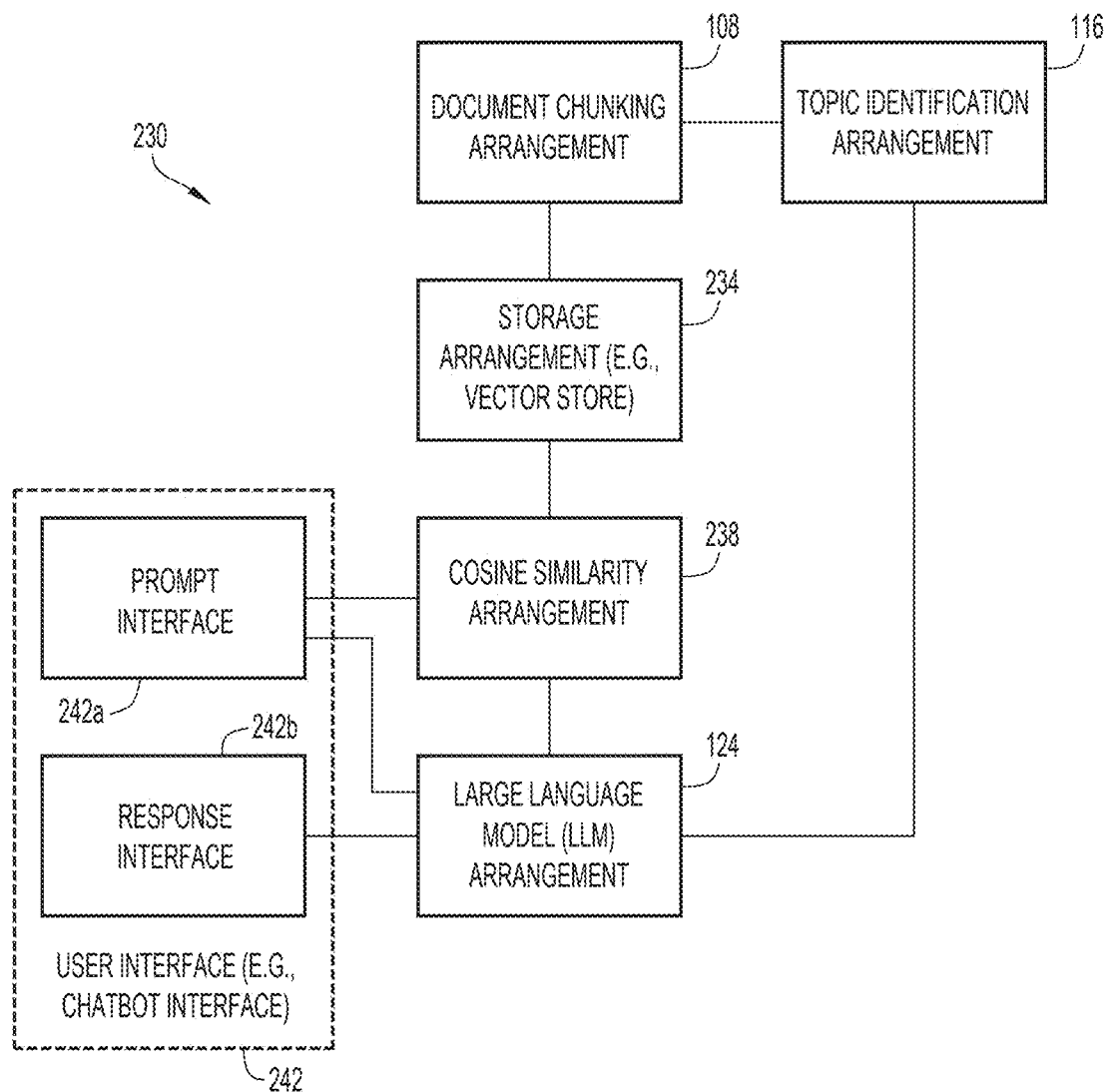
FIG. 2 is a diagrammatic representation of a system that includes an augmented Retrieval-Augmentation Generation (RAG) framework in accordance with an embodiment.

A RAG framework may be substantially incorporated in an overall system which enables topics associated with documents to be identified such that a user who provided an initial prompt to a chatbot may be queried to provide clarification such that appropriate documents may be selected for processing by an LLM arrangement based on the clarification. FIG. 2 is a diagrammatic representation of a system that includes an improved or augmented RAG framework and an LLM arrangement in accordance with an embodiment. A system 230 includes document chunking arrangement 108, topic identification arrangement 116, and LLM arrangement 124 of FIG. 1. System 230 also includes a storage arrangement 234, a cosine similarity arrangement 238, and a user interface 242. In one embodiment, LLM arrangement 124, storage arrangement 234 and cosine similarity arrangement 238 may be associated with a RAG framework.

Document chunking arrangement 108, as discussed above, is configured to effectively divide documents into chunks. Chunks may be provided to topic identification arrangement 116 such that topic identification arrangement 116 may identify ideas or topics associated with chunks. Document chunking arrangement 108 may also provide chunks and/or embeddings associated with chunks to storage arrangement 234. Embeddings may be vector embeddings and may include, but are not limited to including, numerical embeddings for each chunk 112. Storage arrangement 234 may be a vector store, although storage arrangement 234 is not limited to being a vector store.

User interface 242 may generally obtain input, as for example an initial prompt or a follow-up prompt, from a user. In one embodiment, user interface 242 may be a chatbot interface that allows a user to interact with a chatbot. User interface 242 includes a prompt interface 242a that enables a user to provide a prompt, as for example a request, for information to cosine similarity arrangement 238. Prompt interface 242a may also generally be arranged to provide a query, as for example a query for additional information related to an initial prompt from a user, to the user. User interface 242 also includes a response interface 242b which provides a response to a prompt. For example, response interface 242b is configured to enable a user to obtain a response to an initial prompt that is based in part upon additional information provided by the user.

Cosine similarity arrangement 238 obtains data stored in storage arrangement 234, e.g., vectors associated with chunks of documents, and applies a cosine similarity algorithm or formula to the data obtained from storage arrangement 234. For example, cosine similarity arrangement 238 obtains a measure of similarity between vectors contained in the data obtained from storage arrangement 234. Cosine similarity arrangement 238 may effectively quantify similarity by calculating or otherwise determining the cosine of angles between vectors associated with chunks of documents. It should be appreciated that although cosine similarity arrangement 238 is described, other arrangements configured to measure similarity associated with data obtained from storage arrangement 234 may instead, or additionally, be included in system 230.

When a prompt or instruction is obtained by cosine similarity arrangement 238 via prompt interface 242a, cosine similarity arrangement 238 may obtain chunks 112, e.g., as part of vectors, from storage arrangement 234 and provide the topics to LLM arrangement 124. A prompt may generally include, but is not limited to including, an instruction or question for LLM arrangement 124, contextual information to be used by LLM arrangement 124, and/or any other information that may enable LLM arrangement 124, or AI in general, to process the prompt in order to provide a response. LLM arrangement 124 may use chunks 112 and topics obtained from topic identification arrangement 116 to determine whether a response to the prompt may benefit from additional information. LLM arrangement 124 may identity or formulate a query which may solicit the additional information, and provide the query to prompt interface 242a. When additional information is obtained in response to the query, as for example in the form of a follow-up prompt from a user, LLM arrangement 124 may use the additional information, the initial prompt, and a context associated with chunks and topics to provide a response to response interface 242b.

Figure 3A:
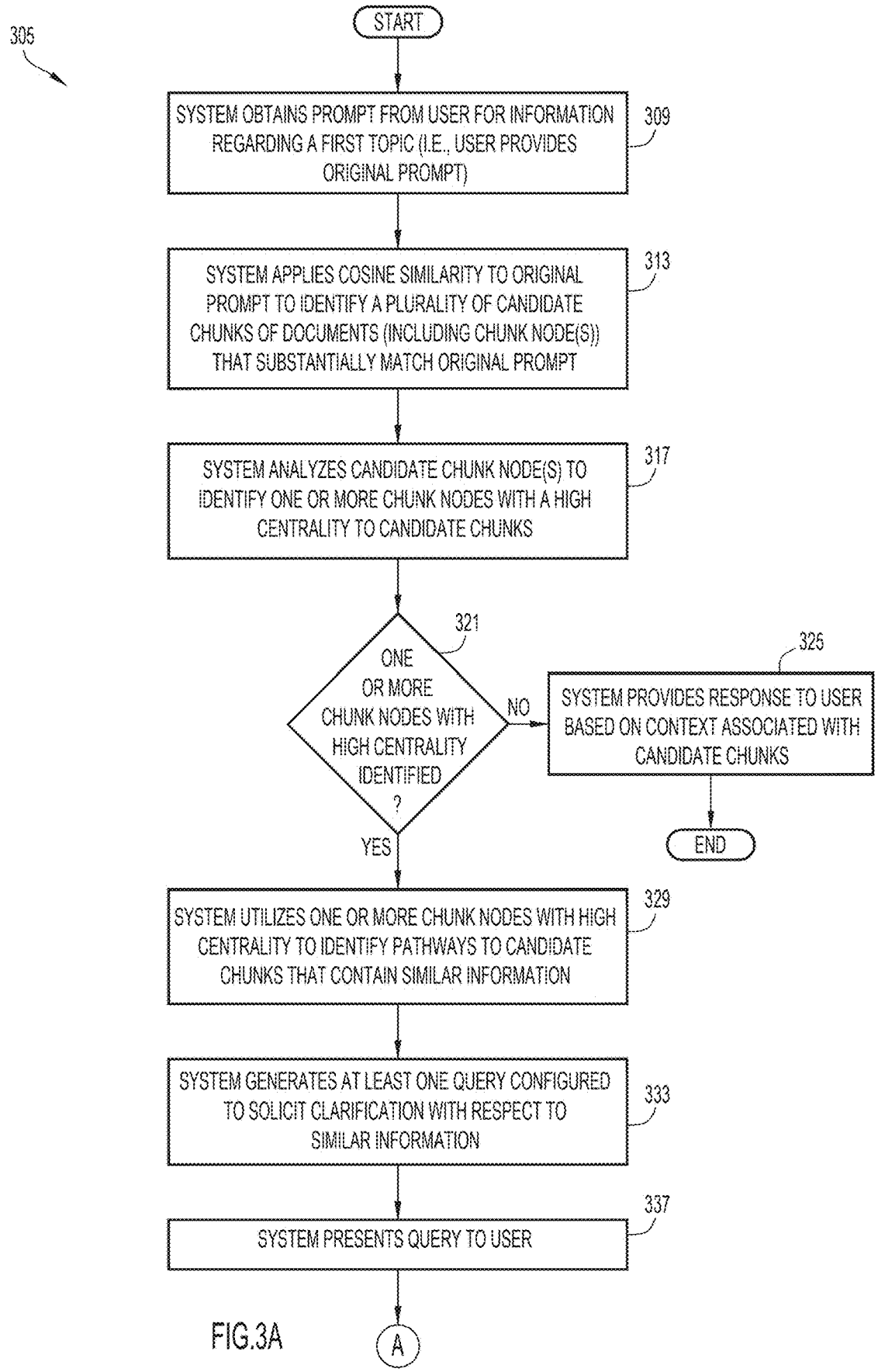
FIGS. 3A and 3B are a process flow diagram which illustrates a method of providing a response to a user based on a prompt provided by the user in accordance with an embodiment.
Figure 3B:
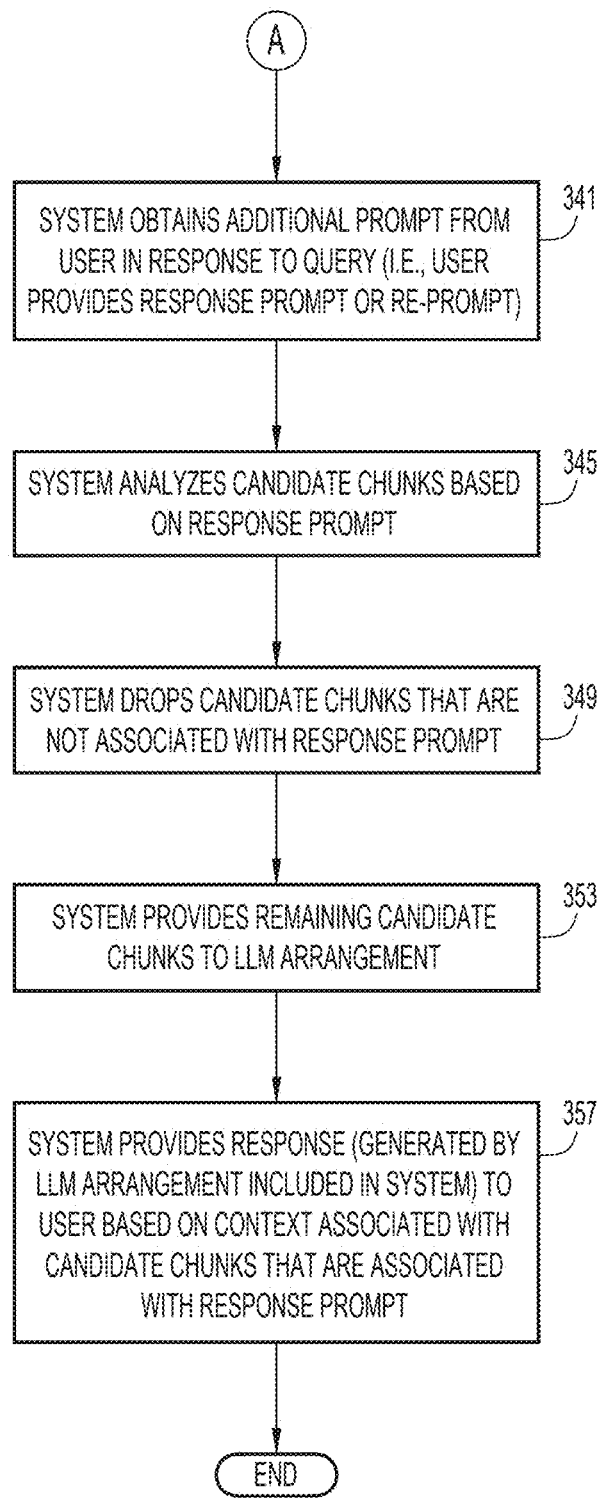

FIGS. 3A and 3B are a process flow diagram which illustrates a method of system that includes an improved or augmented RAG framework providing a response to a user based on an initial or original prompt provided by the user in accordance with an embodiment. A method 305 of providing a response to a user begins at a step 309 in which an augmented RAG framework or system obtains a prompt from a user for information regarding a first topic. That is, the system obtains an initial or original prompt provided by the user. The original prompt may be worded in the form of either a statement or a question. In one embodiment, the prompt may be obtained through a user interface such as a user interface 242 of FIG. 2.

In a step 313, the system applies cosine similarity, or a cosine similarity analysis, to the original prompt to identify a plurality of candidate chunks of documents, including one or more chunk nodes, that substantially match the original prompt. Cosine similarity provides an indication relating to how similar documents may be to the context of the original prompt. Applying cosine similarity to the original prompt may include analyzing vectors associated with candidate chunks of documents. It should be appreciated that while cosine similarity allows for chunks of documents to be identified, data analysis used to identify chunks of documents is not limited to cosine similarity.

After the plurality of candidate chunks is identified, the system analyzes one or more chunk nodes to identify chunk nodes with a relatively high centrality to the candidate chunks in a step 317. Topics associated with the candidate chunks may be used to facilitate the identification of chunk nodes with a relatively high centrality to the candidate chunks. Chunk nodes with relatively high centrality may generally be chunk nodes which are included in multiple paths or pathways between candidate chunk nodes. Centrality is a calculation of how "connected" a device is to other nodes in a graph based, at least in part, upon comparing the connections of nodes to other nodes. In one embodiment, a relatively high centrality may be determined, or otherwise identified, by using existing mathematical implementations of scoring to assess the relative centrality one node's connections to documents. Mathematical implementations of scoring may include, but are not limited to including, Eigenvector, Closeness, and in-degree scoring. A node that has a relatively high number of connections to documents that have a relation through a particular topic may be identified as a node of higher centrality, while a document that reinforces a single idea an/or is dissimilar to other documents in the collection may be a node of lower centrality. It should be appreciated that a determination of whether a node is of a relatively high centrality may involve a relative comparison such that a greater than average centrality may indicate that a topic spans multiple documents and potential thoughts. One method of identifying chunk nodes of relatively high centrality will be discussed below with reference to FIG. 6.

A determination is then made in a step 321 as to whether one or more chunk nodes with relatively high centrality have been identified. If the determination is that there are essentially no chunk nodes with a relatively high centrality, the implication may be that the original prompt provided sufficient information to allow a substantially relevant and/or accurate response to be provided, and that additional information is not needed from a user. Accordingly, process flow moves from step 321 to a step 325 in which the system provides a response to the user based on the context associated with the candidate chunks, and the method of providing a response to a user is completed.

Alternatively, if it is determined in step 321 that one or more chunk nodes with a relatively high centrality have been identified, the indication is that soliciting additional information from the user may enable a more relevant and/or accurate response to be provided to the user. As such, in a step 329, the system utilizes the one or more chunk nodes with a relatively high centrality to identify paths or pathways to candidate chunks that contain similar information. Similar information may include, but is not limited to including, information that addresses the same general topic and/or information that may be described using substantially the same text. In one embodiment, similar information may indicate that an outcome or an intent are substantially the same, but a method or procedure may be different. For example, different service providers may follow different procedures to configure an identity provider for an application, but the outcome of having a configured identity provider is substantially the same. That is, methods of achieving an outcome may differ, but there may be a recognition of intent and an understanding that there may be multiple pathways to an outcome.

Once pathways to candidate chunks that contain similar information are identified, the system generates at least one query or question in a step 333 configured to solicit clarification with respect to similar information. In other words, the system effectively determines a query that is tailored or otherwise arranged to request information from the user that would substantially enable the similar information to be differentiated.

In a step 337, the system presents the query to the user, e.g., through a user interface such as a chatbot interface. The user may provide a response, or a response prompt, to the query in a step 341. That is, the system obtains an additional or follow-up prompt from the user in response to the query through a user interface.

After the system obtains the response prompt, the system analyzes candidate chunks based on the response prompt in a step 345. In one embodiment, the response prompt is expected to accurately answer the query. It should be appreciated, however, that in some situations, the response prompt may not accurately answer the query. In such a case, there may be a follow-up query to the query which provides additional context, or the system may indicate that the response prompt does not provide an accurate answer to the query and offer some options for pathways. The system analyzes candidate chunks based on the response prompt to identify candidate chunks which are consistent or otherwise associated with the response prompt.

The system drops candidate chunks that are not consistent with or otherwise associated with the response prompt in a step 349. That is, the system effectively keeps or maintains the candidate chunks that are associated with the response chunk.

From step 349, process flow moves to a step 353 in which the system provides remaining candidate chunks to an LLM arrangement. In one embodiment, the LLM arrangement may be included in the system, although the LLM arrangement may be a substantially separate module that is in communication with the system.

Based on the remaining candidate chunks, the LLM arrangement may effectively generate a response that the system provides to the user in a step 357. In other words, the system provides a response to the user based on the context associated with the candidate chunks that are associated with the response prompt, as well as the original prompt. The context may include one or more topics associated with the candidate chunks, e.g., topics identified by topic identification arrangement 116 of FIGS. 1 and 2. The response may be provided through a user interface. Upon the system providing the response to the user based on the context associated with candidate chunks, the method of providing a response to a user is completed.

Figure 4A:
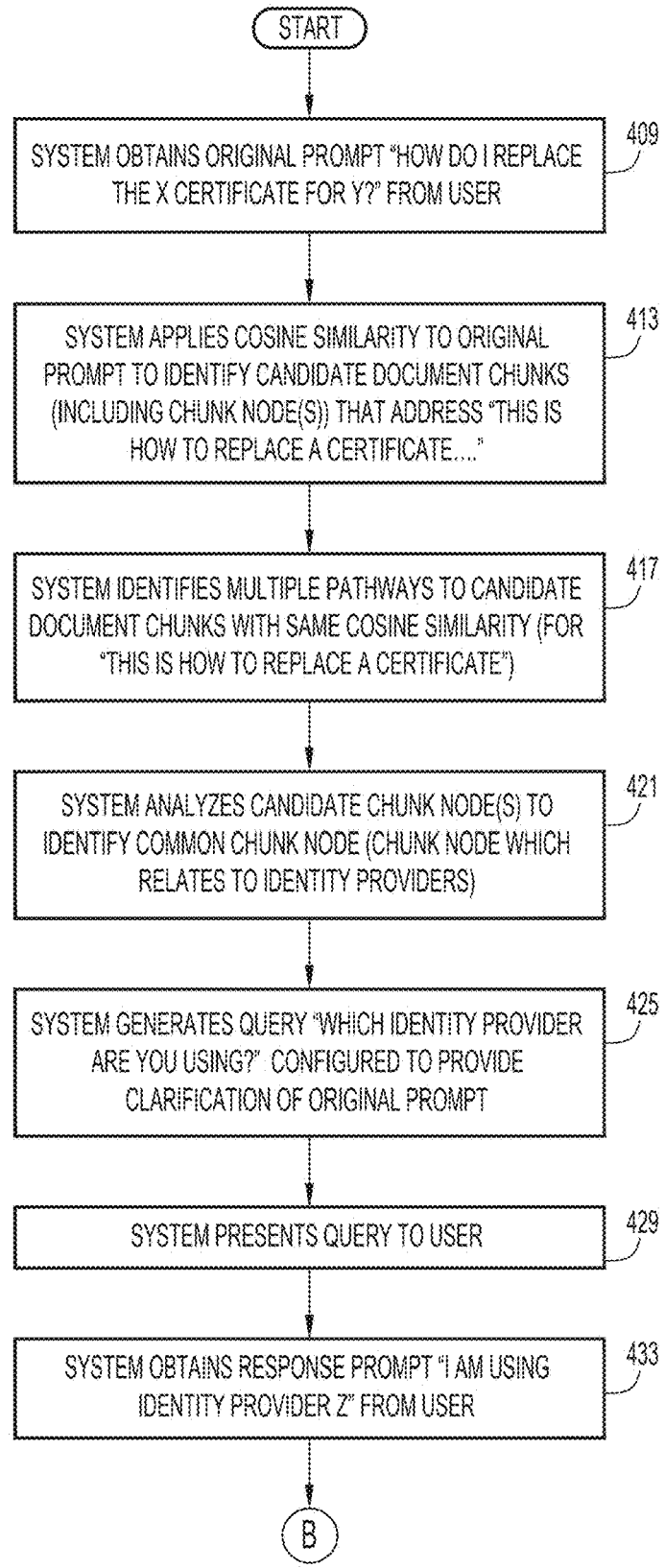
FIGS. 4A and 4B are a process flow diagram which illustrates one example of a method of providing a response to a user based on a prompt provided by the user in accordance with an embodiment.
Figure 4B:
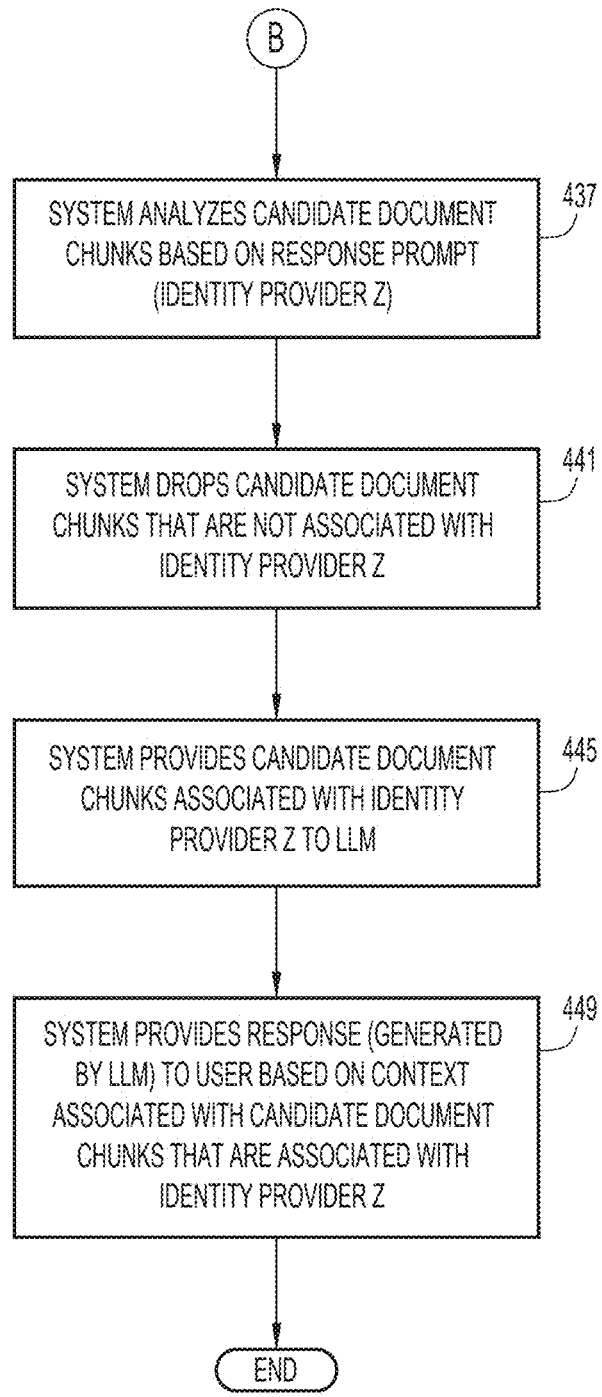

With reference to FIGS. 4A and 4B, one example of a method of providing a response to a user based on a prompt provided by the user will be described in accordance with an embodiment. A method 405 of providing a response to a user based on a prompt begins at a step 409 in which a system obtains an original prompt from a user in which the user effectively asks "how do I replace the X certificate for Y?" The user may provide the original prompt to the system using a user interface.

Once the system applies the prompt from the user, the system applies cosine similarity to the original prompt to identify candidate document chunks, including chunk nodes, that address "this is how to replace a certificate" in a step 413. The system then identifies, in a step 417, multiple pathways to candidate document chunks with substantially the same cosine similarity for "this is how to replace a certificate."

In a step 421, the system analyzes the candidate chunk nodes to identify a common chunk node. By way of example, a common chunk node associated with "how do I replace the X certificate for Y?" may relate to identity providers.

From step 421, process flow moves to a step 425 in which the system generates a query "which identity provider are you using?" that is configured to provide clarification of the original prompt. The system then presents the query to the user in a step 429.

After the user is presented with the query, the user may provide a response prompt to the system. The system obtains the response prompt from the user in a step 433. The response prompt may specify "I am using identity provider Z."

In a step 437, the system analyzes the candidate document chunks based on the response prompt, e.g., the prompt which specifies identity provider Z. The system then drops candidate document chunks in a step 441 that are not associated with identity provider Z.

Once the candidate document chunks that are not associated with identity provider Z are dropped, the system provides the remaining candidate document chunks, or the candidate document chunks associated with identity provider Z, to an LLM in a step 445. The LLM then generates a response based on the context associated with candidate document chunks that are associated with identity provider Z, and the system provides the response to the user in a step 449. After the system provides the response to the user, the method of providing a response to a user is completed.

Known graph traversal methods may be used to identify substantially all possible pathways from each candidate chunk to each other candidate chunk. The use of graph traversal methods effectively limits a super-graph of all documents, and filters down to a subgraph of ideas and topics relative to the returned candidate chunks. Pathways may be calculated by using one or more suitable random walk-algorithms given a starting chunk and ending chunk. The random walk-algorithms may identify the different traversal paths that connect one chunk to another when evaluating all the paths between two chunks may be identified as idea nodes.

Figure 5A:
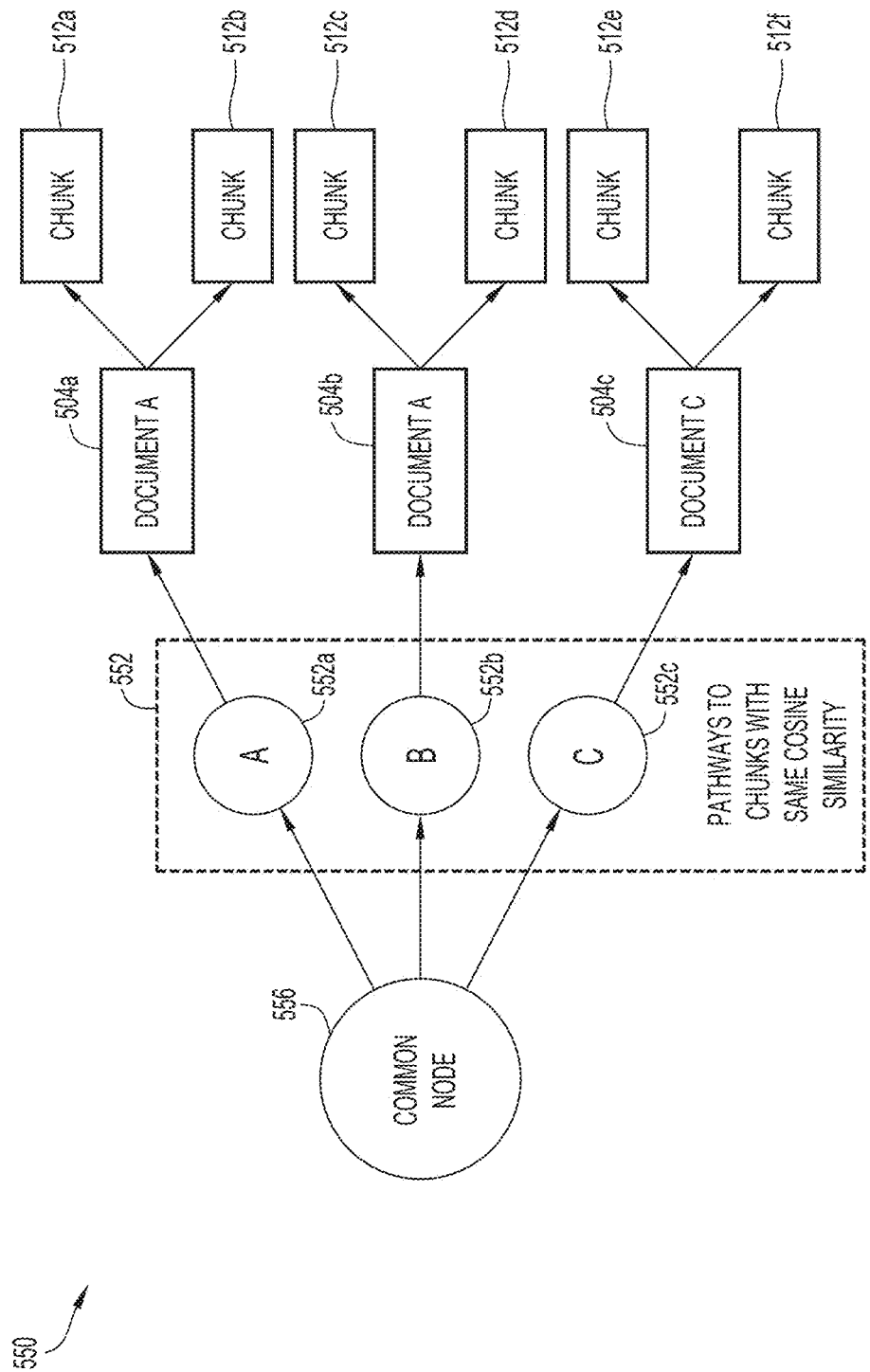
FIG. 5A is a diagrammatic representation of a common node associated with chunks returned as part of a cosine similarity match in accordance with an embodiment.

FIG. 5A is a diagrammatic representation of a common node associated with chunks returned as part of a cosine similarity match in accordance with an embodiment. A knowledge graph 550, which may be created though linking chunkIDs to concepts associated with candidate chunks 512a-f and topics related to candidate chunks 512a-f, includes a common node 556 that is associated with pathways 552 which include candidate chunks 512a-f. In one embodiment, common node 556 may be a chunk node. Candidate chunks 512a-f are snippets of text and the like that are included in documents 504a-c. Document 504a includes chunk 512a and chunk 512b, document 504b includes chunk 512c and chunk 512d, and document 504c includes chunk 512e and chunk 512f. Chunks 512a-f are identified as candidates that may be appropriate as a response to an original or initial prompt from a user.

In the described embodiment, pathways 552 to chunks 512a-f with substantially the same cosine similarity include a first pathway 552a, a second pathway 552b, and a third pathway 552c. First pathway 552a is associated with chunk 512a and chunk 512b, second pathway 552b is associated with chunk 512c and chunk 512d, and third pathway 552c is associated with chunk 512e and chunk 512f. Each pathway 552a-c includes common node 556.

In order for an appropriate chunk 512a-f to be identified as suitable to include in a response to an original or initial prompt from a user, common node 556 may be used to formulate a query to a user. The query may be used to solicit additional information from a user, as for example in the form of a re-prompt or follow-up prompt, which may lead to the identification of an appropriate chunk 512a-f.

Figure 5B:
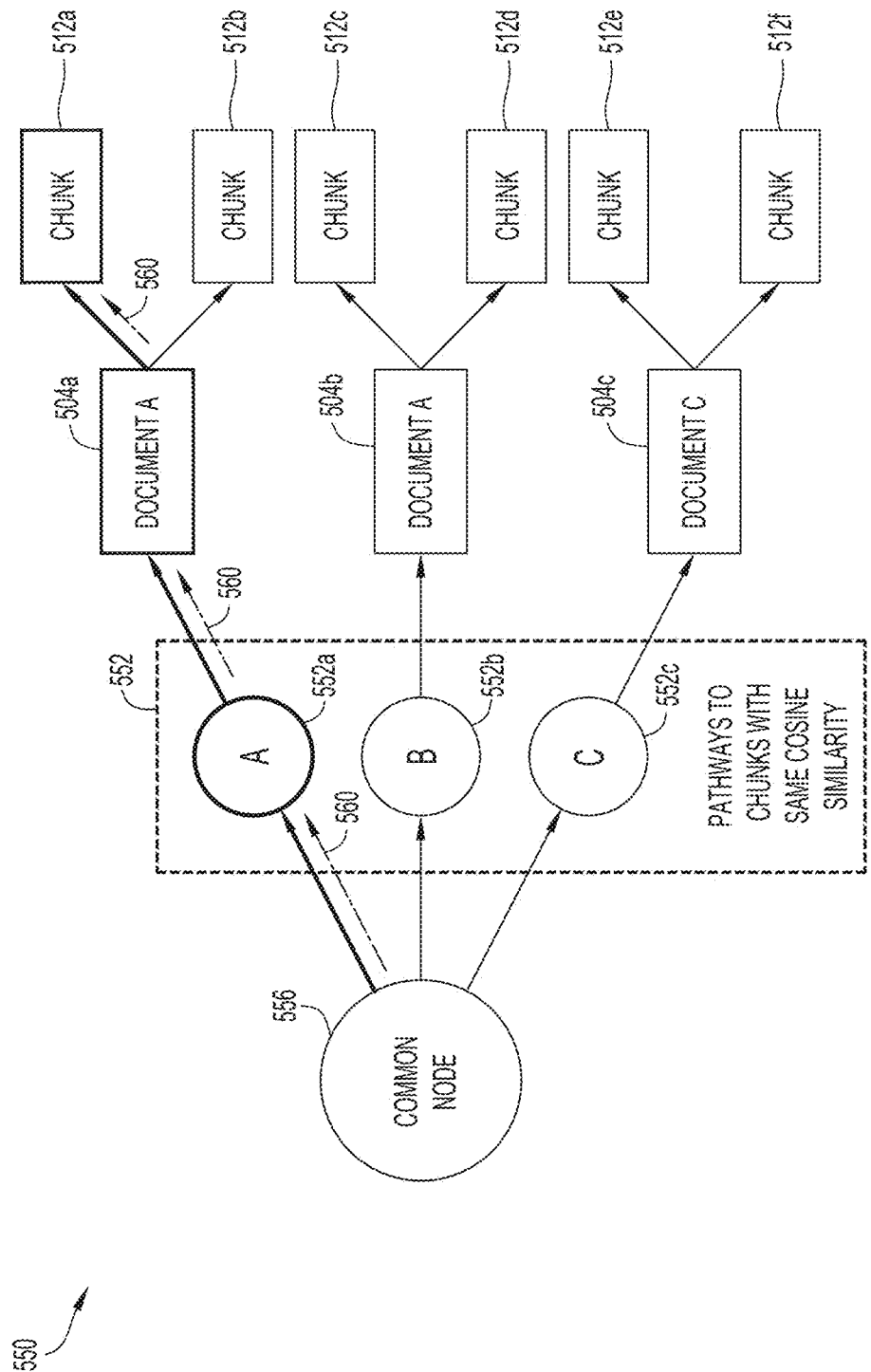
FIG. 5B is a diagrammatic representation of a path associated with a response to a query after a re-prompt or follow-up prompt associated with a common node, e.g., common node 556 of FIG. 5A, in accordance with an embodiment.

After a re-prompt is obtained from a user, a suitable pathway 552a-c to a chunk 512a-f or a respective document 504a-c may be obtained for use in providing a response to the user. As shown in FIG. 5B, a pathway 552a is effectively selected for use in providing a response to a user after additional information obtained in a re-prompt is analyzed.

As indicated by path 560, chunk 512*a* and document 504*a* associated with pathway 552*a* are appropriate to respond to the original or initial prompt provided by the user.

Figure 6:
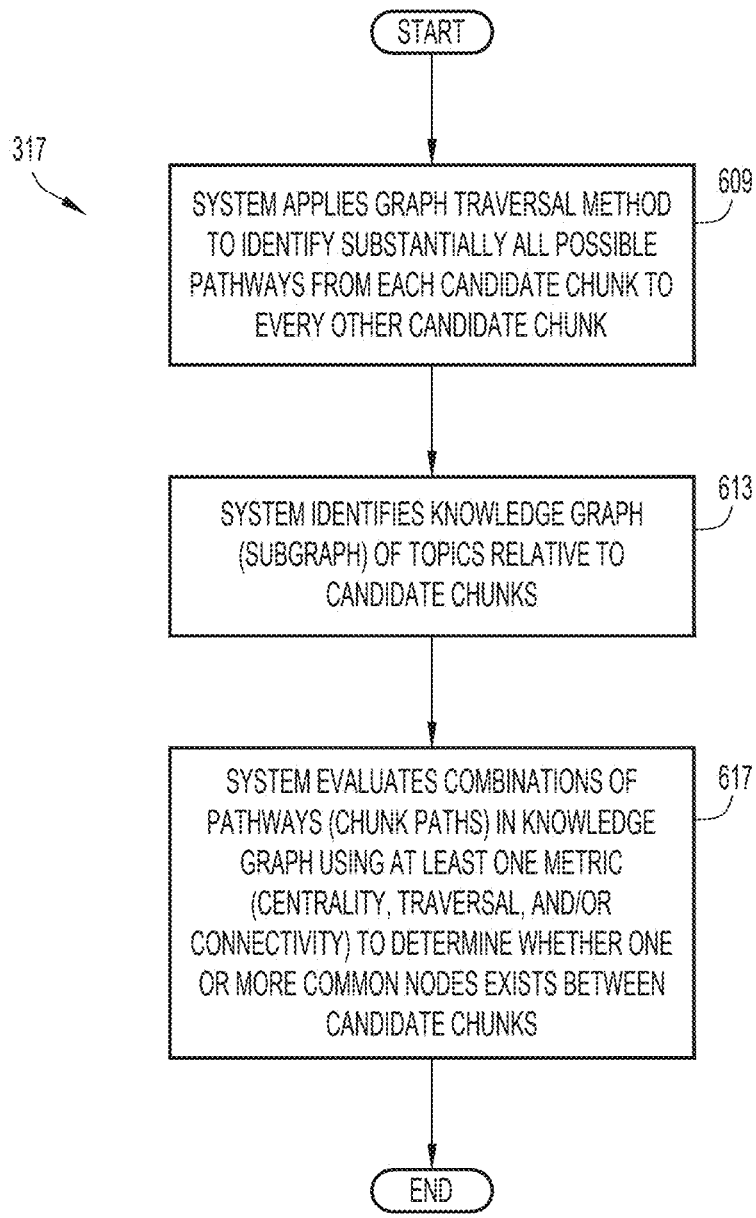
FIG. 6 is a process flow diagram which illustrates one method of analyzing candidate chunk node(s) to identify one or more chunk nodes with a high centrality to candidate chunks, e.g., step 317 of FIG. 3A, in accordance with an embodiment.

As discussed above, a system such as system 230 may analyze candidate chunk nodes to identify chunk nodes with a high centrality to candidate chunks. With reference to FIG. 6, one method of analyzing candidate chunk node(s) to identify one or more chunk nodes with a high centrality to candidate chunks, e.g., step 317 of FIG. 3A, will be described in accordance with an embodiment. Method or step 317 of analyzing one or more candidate chunk nodes begins at a step 609 in which the system applies a graph traversal method to identify substantially all possible pathways from each candidate chunk to every other candidate chunk. The pathways or paths may be calculated by using one or more suitable random walk-algorithms given a starting and ending candidate chunk. The random walk-algorithms may identify the different traversal pathways that connect one candidate chunk to another.

In a step 613, the system identifies a knowledge graph or subgraph of topics relative to the candidate chunks. Using the knowledge graph, the system evaluates combinations of pathways or chunk paths using at least one metric to determine whether one or more common nodes exists between candidate chunks in a step 617. The combinations of pathways may be evaluated to determine if there are nodes, e.g., nodes corresponding to ideas or topics, which are common between the candidate chunks. For example, common nodes traversed when evaluating paths between two candidate chunks may be identified as idea nodes. The metrics used to determine whether one or more common nodes exists may vary and may include, but are not limited to including, centrality, traversal, and/or connectivity. Once the combinations of pathways are evaluated, the method of analyzing one or more candidate chunks is completed.

The paths are calculated by using one or more suitable random walk-algorithms given a starting and ending node. The random walk-algorithms may identify the different traversal paths that connect one chunk of data to another. The combinations of these paths may then be evaluated to determine if there are "idea" nodes that are common between the candidate chunks. For example, any common nodes traversed when evaluating all the paths between two chunks may be identified as idea nodes.

After idea nodes are identified, nodes in the paths may then be evaluated for their centrality to other idea and chunk nodes in a filtered knowledge graph. In one embodiment, centrality may be utilized as a metric to determine if a node has a relatively high degree of "connectedness" to candidate chunks. It should be appreciated, however, that alternate traversal or connectivity metrics may be used as well.

The number of times chunks nodes in pathways are used to generate queries for additional information in response to initial prompts from users may be tracked to provide an indication, over time, of which chunk nodes are the most relevant. Tracking the relevance of chunk nodes may enable a determination to be made as to when particular content is out of date or not relevant. By way of example, when a particular chunk node is either not utilized or utilized at a significantly lower rate than other chunk nodes, the particular chunk node may be determined to be out of date. The order in which chunk nodes are traversed in a path may also be tracked such that well-known or frequently used paths may be identified and potentially weighted to influence path traversal. Tracking the order of node traversal may enable weighting the path associated with certain nodes after a question is answered sufficiently.

Figure 7:
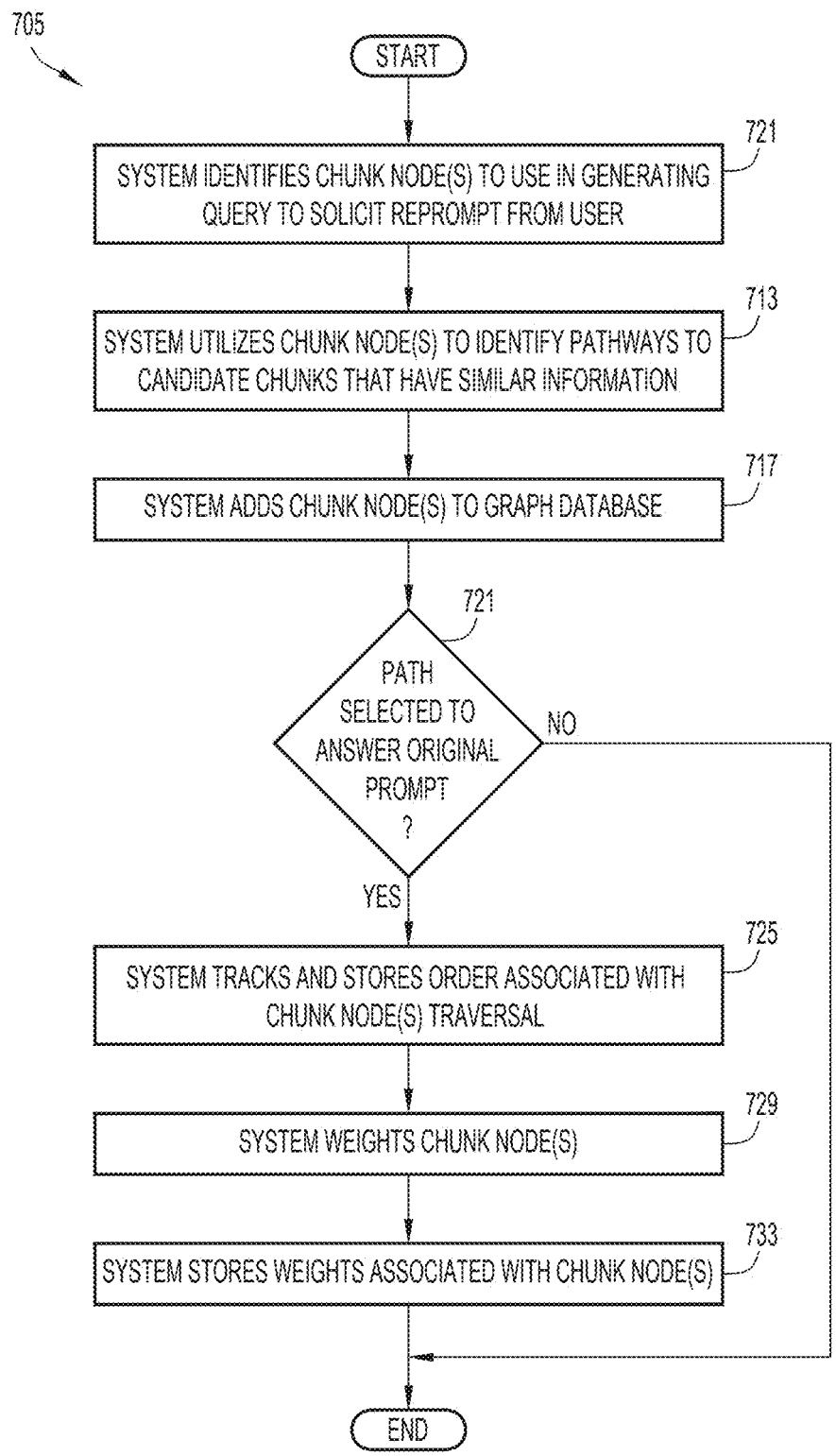
FIG. 7 is a process flow diagram which illustrates a method of tracking information associated with one or more chunk nodes in accordance with an embodiment.

FIG. 7 is a process flow diagram which illustrates a method of tracking information associated with one or more chunk nodes in accordance with an embodiment. A method 705 of tracking information associated with one or more chunk nodes begins at a step 709 in which a system identifies one or more chunk nodes to use in generating a query to solicit a re-prompt from a user.

In a step 713, the one or more chunk nodes are used to identify pathways to candidate chunks that contain similar information. The one or more chunk nodes, along with information relating to at least one pathway associated with the one or more chunk nodes, may be stored in a graph database in a step 717.

A determination is made in a step 721 in which it is determined whether a path has been selected to answer an original prompt from the user. If it is determined that a path has not been selected to answer the original prompt, the method of tracking information associated with one or more chunk nodes is completed.

Alternatively, if it is determined in step 721 that a path has been selected to answer the original prompt, then process flow proceeds to a step 725 in which the system tracks and stores an order associated with the order in which one or more chunk nodes are traversed. By tracking the order of node traversal over time, paths associated with certain nodes may be weighted after an original prompt is answered. The chunk nodes are weighted in a step 729. Weights used to weight chunk nodes may be determined in any suitable manner. By way of example, weights may be assigned to conversations that cease at various points in the knowledge graph. The weights may be used to influence additional path traversal and/or starting points for paths. Once the weights are assigned by the system in step 729, the system stores the weights in a step 733, and the method of tracking information associated with one or more chunk nodes is completed.

Figure 8:
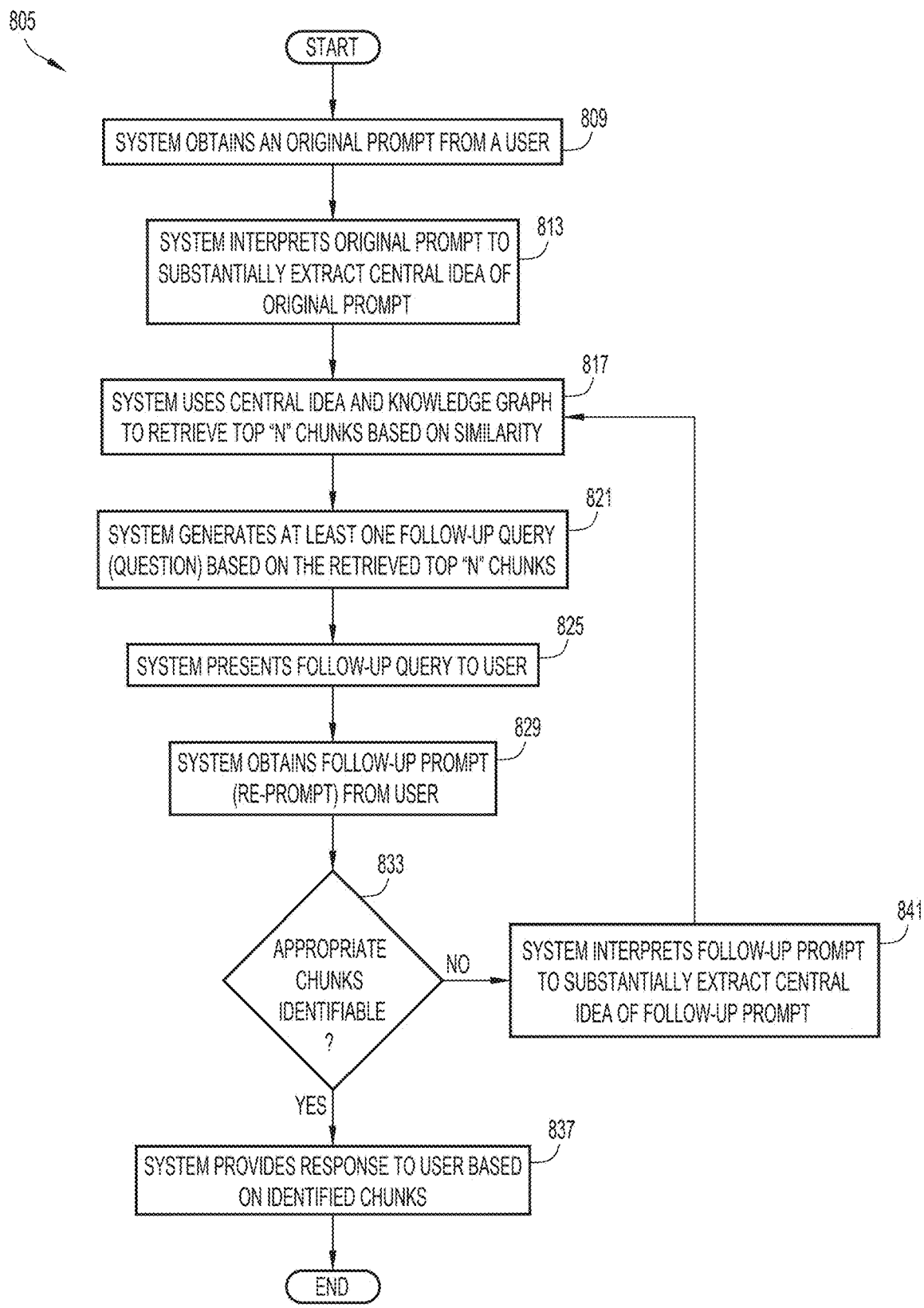
FIG. 8 is a process flow diagram which illustrates a method of soliciting a re-prompt or follow-up prompt that utilizes stored information to generate a query in accordance with an embodiment.

As described above, the similarity of a prompt to candidate document chunks may be identified, and a knowledge graph may be traversed to identify convergence points of topics for purposes of soliciting a re-prompt. It should be appreciated, however, that rather than implementing a process which effectively starts with the similarity of a prompt to candidate document chunks, a process may instead begin with obtaining stored document chunks that are related to the prompt. FIG. 8 is a process flow diagram which illustrates a method of soliciting a re-prompt or follow-up prompt that utilizes stored information to generate a query in accordance with an embodiment. A method 805 of soliciting a report that utilizes stored information begins at a step 809 in which a system obtains an original, or initial, prompt from a user.

In a step 813, the system interprets or otherwise analyzes the original prompt to substantially extract a central idea or topic of the original prompt. Once the central idea or topic is extracted, the system uses the central idea and a knowledge graph in a step 817 to retrieve a top "N" chunks based on similarity to the central idea. It should be appreciated that number "N" may vary widely. For example, number "N" may be approximately three.

After the top "N" chunks are obtained, the system generates at least one follow-up query or question based on the retrieved top "N" chunks in a step 821. For example, the system may identify additional information that may enable the top "N" chunks to effectively be differentiated, and create at least one follow-up query to solicit the additional information. The system presents the follow-up query to the user in a step 825. In a step 829, the system obtains a follow-up prompt from the user. The follow-up prompt may provide the additional information requested in the follow-up query.

A determination is made in a step 833 as to whether the appropriate chunks which enable the original prompt to be identified are identifiable, given the additional information included in the follow-up prompt. If the determination is that chunks which are appropriate to enable the original prompt to be substantially answered are identifiable, the system provides a response to the user based on the identified chunks in a step 837, and the method of soliciting a re-prompt that utilizes stored information is completed.

Alternatively, if it is determined in step 833 that the appropriate chunks are not identifiable using the information provided by the user in the follow-up prompt, the implication is that another follow-up prompt may be needed to obtain information needed to identify the appropriate chunks. Accordingly, process flow proceeds from step 833 to a step 841 in which the system interprets the follow-up prompt to substantially extract the central idea or topic of the follow-up prompt. After the follow-up prompt is interpreted, process flow returns to step 817 in which the system uses the central idea of the follow-up prompt and a knowledge graph to retrieve the top "N" chunks based on similarity.

Figure 9:
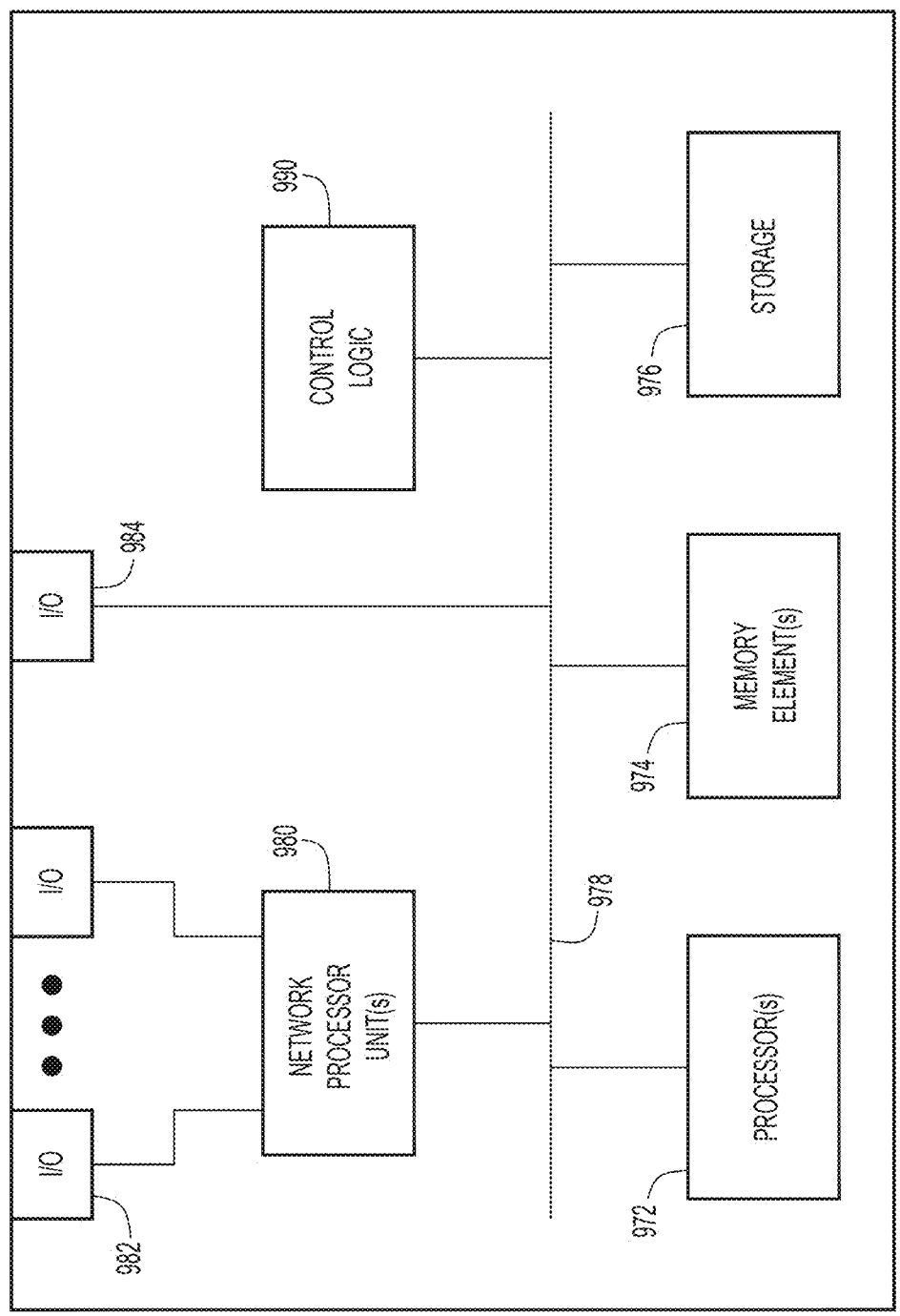
FIG. 9 is an illustration of a hardware block diagram of a computing device that may be used to support the processes described with respect to the above figures in accordance with an embodiment.

Referring next to FIG. 9, a computing system or device which is suitable for performing functions associated with operations discussed with respect to the figures above will be described in accordance with an embodiment. In some embodiments, an apparatus or computing device 970 may be configured as any entity or entities as discussed for the techniques depicted in connection with the figures described above in order to perform operations of the various techniques discussed herein. For example, computing device 970 may represent overall system 100 of FIG. 1 and/or any of document chunking arrangement 108, topic identification arrangement 116, and/or LLM arrangement 124 of FIG. 1. Computing device 970 may also represent system 230 of FIG. 2.

Computing device 970 may be any apparatus that may include one or more processor(s) 972, one or more memory element(s) 974, storage 976, a bus 978, one or more network processor unit(s) 980 interconnected with one or more network input/output (I/O) interface(s) 982, one or more input/output (I/O) interface(s) 984, and control logic 990. In some embodiments, instructions associated with logic for computing device 970 may overlap in any suitable manner, and are not limited to the specific allocation of instructions and/or operations described herein.

Processor(s) 972 may include at least one hardware processor configured to execute various tasks, operations, and/or functions for computing device 970 as described herein according to logic, software, and/or instructions configured for computing device 970. Processor(s) 972, as for example one or more hardware processors, may execute substantially any type of instructions associated with data to achieve the operations detailed herein. By way of example, processor(s) 972 may transform an element or an article such as data or information from one state or thing to another state or thing. Any of potential processing elements, microprocessors, digital signal processor, baseband signal processor, modem, PHY, controllers, systems, managers, logic, and/or machines described herein may be construed as being encompassed within the broad term "processor."

Memory element(s) 974 and/or storage 976 may be configured to store data, information, software, and/or instructions associated with computing device 970, and/or logic configured for memory element(s) 974 and/or storage 976. By way of example, any logic described herein such as control logic 990 may, in some embodiments, be stored for computing device 970 using any combination of memory element(s) 974 and/or storage 976. It should be appreciated that storage 976 may be consolidated with memory element(s) 974, or vice versa, and/or may overlap or exist in any other suitable manner.

In one embodiment, bus 978 may be configured as an interface that enables one or more elements of computing device 970 to communicate in order to exchange information and/or data. Bus 978 may be implemented with substantially any architecture designed for passing control, data and/or information between processors, memory elements or storage, peripheral devices, and/or any other hardware and/or software components that may be configured for computing device 750. In at least one embodiment, bus 758 may be implemented as a fast kernel-hosted interconnect, potentially using shared memory between processes, as for example logic, which may enable efficient communication paths between the processes.

Network processor unit(s) 980 may enable communication between computing device 970 and other systems, entities, etc., via network I/O interface(s) 982 which may be wired and/or wireless to facilitate operations discussed for various embodiments described herein. Network processor unit(s) 980 may be configured as a combination of hardware and/or software, such as one or more Ethernet driver(s) and/or controller(s) or interface cards, optical driver(s) and/or controller(s) such as Fibre Channel, wireless receivers/transmitters/transceivers, baseband processor(s)/modem(s), and/or other similar network interface driver(s) and/or controller(s) now known or hereafter developed to enable communications between computing device 970 and other systems, entities, etc. to facilitate operations for various embodiments described herein. In one embodiment, network I/O interface(s) 982 may be configured as one or more Ethernet port(s), Fibre Channel ports, any other I/O port(s), and/or antenna(s)/antenna array(s) now known or hereafter developed. Thus, network processor unit(s) 980 and/or network I/O interface(s) 982 may include suitable interfaces for receiving, transmitting, and/or otherwise communicating data and/or information in a network environment.

I/O interface(s) 984 may allow for input and output of data and/or information with other entities that may be connected to computing device 970. For example, I/O interface(s) 984 may provide a connection to external devices such as a keyboard, keypad, a touch screen, and/or any other suitable input and/or output device now known or hereafter developed. In some instances, external devices may also include, but are not limited to including, portable computer readable, non-transitory storage media such as database systems, thumb drives, portable optical or magnetic disks, and memory cards. External devices may also include a structure or mechanism arranged to display data to a user, such as, for example, a computer monitor, a display screen, or the like.

Control logic 990 may include instructions that, when executed, cause processor(s) 972 to perform operations, which may include, but are not limited to including, providing overall control operations of computing device; interacting with other entities, systems, etc. described herein; maintaining and/or interacting with stored data, information, parameters, etc. as for example memory element(s), storage, data structures, databases, tables, etc.; combinations thereof; and/or the like to facilitate various operations for embodiments described herein.

The programs described herein, as for example control logic 990 may be identified based upon one or more applications for which the programs are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In some aspects, the techniques described herein relate to a method including: obtaining, at an interface to a system that includes a large language model (LLM) arrangement, a first prompt; identifying a plurality of candidate chunks of documents that match the first prompt; analyzing the plurality of candidate chunks to identify a chunk node, the chunk node being associated with the plurality of candidate chunks; generating a query, the query being arranged to solicit information associated with the plurality of candidate chunks; obtaining a second prompt, the second prompt being obtained in response to the query; analyzing the plurality of candidate chunks using the second prompt, wherein analyzing the plurality of candidate chunks using the second prompt includes identifying at least a first candidate chunk of the plurality of candidate chunks that is associated with the second prompt, and wherein the first candidate chunk has a context; and generating a response to the first prompt using the context.

In some aspects, the techniques described herein relate to a method wherein analyzing the plurality of candidate chunks to identify a chunk node includes determining a centrality of the chunk node with respect to the plurality of candidate chunks.

In some aspects, the techniques described herein relate to a method further including: identifying a plurality of pathways in a knowledge graph to the plurality of candidate chunks using the chunk node, wherein the plurality of candidate chunks contains similar information.

In some aspects, the techniques described herein relate to a method wherein identifying the plurality of candidate chunks includes applying a cosine similarity analysis to the first prompt.

In some aspects, the techniques described herein relate to a method further including: determining at least one topic associated with the plurality of candidate chunks; and providing the at least one topic to the LLM arrangement, wherein generating the query includes processing the at least one topic and the plurality of candidate chunks using the LLM arrangement.

In some aspects, the techniques described herein relate to a method further including: providing the first candidate chunk to the LLM arrangement; and generating the response using the LLM arrangement.

In some aspects, the techniques described herein relate to a method wherein the interface is a chatbot interface.

In some aspects, the techniques described herein relate to an apparatus including: one or more network processor units to communicate with devices in a network; and a processor coupled to the one or more network processor units and configured to perform: obtaining, at an interface to a system that includes a large language model (LLM) arrangement, a first prompt, identifying a plurality of candidate chunks of documents that match the first prompt, analyzing the plurality of candidate chunks to identify a chunk node, the chunk node being associated with the plurality of candidate chunks, generating a query, the query being arranged to solicit information associated with the plurality of candidate chunks, obtaining a second prompt, the second prompt being obtained in response to the query, analyzing the plurality of candidate chunks using the second prompt, wherein analyzing the plurality of candidate chunks using the second prompt includes identifying at least a first candidate chunk of the plurality of candidate chunks that is associated with the second prompt, and wherein the first candidate chunk has a context, and generating a response to the first prompt using the context.

In some aspects, the techniques described herein relate to an apparatus wherein analyzing the plurality of candidate chunks to identify a chunk node includes determining a centrality of the chunk node with respect to the plurality of candidate chunks.

In some aspects, the techniques described herein relate to an apparatus wherein the processor is further configured to perform: identifying a plurality of pathways in a knowledge graph to the plurality of candidate chunks using the chunk node, wherein the plurality of candidate chunks contains similar information.

In some aspects, the techniques described herein relate to an apparatus wherein identifying the plurality of candidate chunks includes applying a cosine similarity analysis to the first prompt.

In some aspects, the techniques described herein relate to an apparatus wherein the processor is further configured to perform: determining at least one topic associated with the plurality of candidate chunks; and providing the at least one topic to the LLM arrangement, wherein generating the query includes processing the at least one topic and the plurality of candidate chunks using the LLM arrangement.

In some aspects, the techniques described herein relate to an apparatus wherein the processor is further configured to perform: providing the first candidate chunk to the LLM arrangement; and generating the response using the LLM arrangement.

In some aspects, the techniques described herein relate to a non-transitory computer readable medium encoded with instructions that, when executed by a processor configured to communicate with devices over a network, causes the processor to perform: obtaining, at an interface to a system that includes a large language model (LLM) arrangement, a first prompt; identifying a plurality of candidate chunks of documents that match the first prompt; analyzing the plurality of candidate chunks to identify a chunk node, the chunk node being associated with the plurality of candidate chunks; generating a query, the query being arranged to solicit information associated with the plurality of candidate chunks; obtaining a second prompt, the second prompt being obtained in response to the query; analyzing the plurality of candidate chunks using the second prompt, wherein analyzing the plurality of candidate chunks using the second prompt includes identifying at least a first candidate chunk of the plurality of candidate chunks that is associated with the second prompt, and wherein the first candidate chunk has a context; and generating a response to the first prompt using the context.

In some aspects, the techniques described herein relate to a non-transitory computer readable medium wherein analyzing the plurality of candidate chunks to identify a chunk node includes determining a centrality of the chunk node with respect to the plurality of candidate chunks.

In some aspects, the techniques described herein relate to a non-transitory computer readable medium wherein the instructions are further configured to cause the processor to perform: identifying a plurality of pathways in a knowledge graph to the plurality of candidate chunks using the chunk node, wherein the plurality of candidate chunks contains similar information.

In some aspects, the techniques described herein relate to a non-transitory computer readable medium identifying the plurality of candidate chunks includes applying a cosine similarity analysis to the first prompt.

In some aspects, the techniques described herein relate to a non-transitory computer readable medium wherein the instructions are further configured to cause the processor to perform: determining at least one topic associated with the plurality of candidate chunks; and providing the at least one topic to the LLM arrangement, wherein generating the query includes processing the at least one topic and the plurality of candidate chunks using the LLM arrangement.

In some aspects, the techniques described herein relate to a non-transitory computer readable medium wherein the instructions are further configured to cause the processor to perform: providing the first candidate chunk to the LLM arrangement; and generating the response using the LLM arrangement.

In some aspects, the techniques described herein relate to a non-transitory computer readable medium wherein the interface is a chatbot interface.

Although only a few embodiments have been described in this disclosure, it should be understood that the disclosure may be embodied in many other specific forms without departing from the spirit or the scope of the present disclosure. By way of example, based on the attributes of a knowledge graph, a chatbot prompt a user for additional information or clarification, or utilize an LLM by providing information relating to a common node and related paths to determine an appropriate follow-up prompt re-prompt that would indicate that one candidate chunk may be more relevant than another, and not just similar in text.

In one embodiment, the process of prompting a user for clarification may be iterative such that a defined threshold may be used to determine multiple nodes with a relatively high centrality. An LLM may be used to consolidate multiple ideas into a single re-prompt or zoom out of a knowledge graph further so that multiple questions may be asked to solicit clarification.

While a substantially single LLM arrangement has been described as suitable for generating a knowledge graph and for generating a response to a query, more than one LLM arrangement may be included in an overall system. For instance, a first LLM arrangement may be configured to generate a knowledge graph using chunks and identified topics, and a second LLM arrangement may be configured to generate a response to query without departing from the spirit or the scope of the disclosure.

When a response prompt or re-prompt does not provide information that is expected in response to a query, a system may effectively offer either a full or abbreviated number of potential pathways that a re-prompt could traverse. By way of example, in a chat scenario using identity provider configuration, a re-prompt to a user may contain the available nodes of a higher or greater centrality, or a topic comparison or similarity may be utilized against the available nodes to the re-prompt to make a guess or estimate. Alternatively, when a re-prompt is not determined to be relatively fully responsive to a query, an evaluation may be made to determine that there is relatively low similarity associated with the re-prompt, in which the LLM may respond with a default or generic message. In such an example, the LLM may introduce examples or an abbreviated list of topics that may steer or guide another re-prompt towards a substantially correct outcome, but may have some differences in procedure. It should be appreciated that a threshold for when a re-prompt is considered not to be fully responsive to a query may be based on a threshold or a tunable function. A curator of the documents and a model temperature may set a threshold of categorical similarity of re-prompt responses and topics.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining, at an interface to a system that includes a large language model (LLM) arrangement, a first prompt, the first prompt being obtained from a user;
   identifying a plurality of candidate chunks of documents that match the first prompt;
   analyzing the plurality of candidate chunks to identify a chunk node, the chunk node being associated with the plurality of candidate chunks;
   generating a query, the query being arranged to solicit information associated with the plurality of candidate chunks;
   providing the query to the interface;
   obtaining, at the interface, a second prompt, the second prompt being obtained in response to the query, wherein the second prompt includes information associated with the plurality of candidate chunks;
   analyzing the plurality of candidate chunks using the second prompt, wherein analyzing the plurality of candidate chunks using the second prompt includes identifying at least a first candidate chunk of the plurality of candidate chunks that is associated with the second prompt and dropping a second candidate chunk of the plurality of candidate chunks, and wherein the first candidate chunk has a context;
   generating a response to the first prompt using the context; and
   providing the response to the interface, wherein providing the response to the interface includes enabling the user to obtain the response through the interface.

2. The method of claim 1 wherein analyzing the plurality of candidate chunks to identify a chunk node includes determining a centrality of the chunk node with respect to the plurality of candidate chunks, and wherein dropping the second candidate chunk of the plurality of candidate chunks includes dropping the second candidate chunk as being unrelated to the second prompt.

3. The method of claim 1 further including:
   identifying a plurality of pathways in a knowledge graph to the plurality of candidate chunks using the chunk node, wherein the plurality of candidate chunks contains similar information.

4. The method of claim 1 wherein identifying the plurality of candidate chunks includes applying a cosine similarity analysis to the first prompt.

5. The method of claim 1 further including:
   determining at least one topic associated with the plurality of candidate chunks; and
   providing the at least one topic to the LLM arrangement, wherein generating the query includes processing the at least one topic and the plurality of candidate chunks using the LLM arrangement.

6. The method of claim 1 further including:
   providing the first candidate chunk to the LLM arrangement; and
   generating the response using the LLM arrangement.

7. The method of claim 6 wherein the interface is a chatbot interface, and wherein the system includes a document chunking arrangement that is configured to ingest the documents and to create the plurality of candidate chunks.

8. An apparatus comprising:
   one or more network processor units to communicate with devices in a network; and
   a processor coupled to the one or more network processor units and configured to perform:
      obtaining, at an interface to a system that includes a large language model (LLM) arrangement, a first prompt, the first prompt being obtained from a user;
      identifying a plurality of candidate chunks of documents that match the first prompt;
      analyzing the plurality of candidate chunks to identify a chunk node, the chunk node being associated with the plurality of candidate chunks;
      generating a query, the query being arranged to solicit information associated with the plurality of candidate chunks;
      providing the query to the interface;
      obtaining, at the interface, a second prompt, the second prompt being obtained in response to the query, wherein the second prompt includes information associated with the plurality of candidate chunks;
      analyzing the plurality of candidate chunks using the second prompt, wherein analyzing the plurality of candidate chunks using the second prompt includes identifying at least a first candidate chunk of the plurality of candidate chunks that is associated with the second prompt and dropping a second candidate chunk of the plurality of candidate chunks, and wherein the first candidate chunk has a context;
      generating a response to the first prompt using the context; and
      providing the response to the interface, wherein providing the response to the interface includes enabling the user to obtain the response through the interface.

9. The apparatus of claim 8 wherein analyzing the plurality of candidate chunks to identify a chunk node includes determining a centrality of the chunk node with respect to the plurality of candidate chunks, and wherein dropping the second candidate chunk of the plurality of candidate chunks includes dropping the second candidate chunk as being unrelated to the second prompt.

10. The apparatus of claim 8 wherein the processor is further configured to perform:
    identifying a plurality of pathways in a knowledge graph to the plurality of candidate chunks using the chunk node, wherein the plurality of candidate chunks contains similar information.

11. The apparatus of claim 8 wherein identifying the plurality of candidate chunks includes applying a cosine similarity analysis to the first prompt.

12. The apparatus of claim 8 wherein the processor is further configured to perform:
    determining at least one topic associated with the plurality of candidate chunks; and
    providing the at least one topic to the LLM arrangement, wherein generating the query includes processing the at least one topic and the plurality of candidate chunks using the LLM arrangement.

13. The apparatus of claim 8 wherein the processor is further configured to perform:
    providing the first candidate chunk to the LLM arrangement; and
    generating the response using the LLM arrangement.

14. A non-transitory computer readable medium encoded with instructions that, when executed by a processor configured to communicate with devices over a network, causes the processor to perform:
    obtaining, at an interface to a system that includes a large language model (LLM) arrangement, a first prompt, the first prompt being obtained from a user;
    identifying a plurality of candidate chunks of documents that match the first prompt;
    analyzing the plurality of candidate chunks to identify a chunk node, the chunk node being associated with the plurality of candidate chunks;
    generating a query, the query being arranged to solicit information associated with the plurality of candidate chunks;
    providing the query to the interface;
    obtaining, at the interface, a second prompt, the second prompt being obtained in response to the query, wherein the second prompt includes information associated with the plurality of candidate chunks;
    analyzing the plurality of candidate chunks using the second prompt, wherein analyzing the plurality of candidate chunks using the second prompt includes identifying at least a first candidate chunk of the plurality of candidate chunks that is associated with the second prompt and dropping a second candidate chunk of the plurality of candidate chunks, and wherein the first candidate chunk has a context;
    generating a response to the first prompt using the context; and
    providing the response to the interface, wherein providing the response to the interface includes enabling the user to obtain the response through the interface.

15. The non-transitory computer readable medium of claim 14 wherein analyzing the plurality of candidate chunks to identify a chunk node includes determining a centrality of the chunk node with respect to the plurality of candidate chunks, and wherein dropping the second candidate chunk of the plurality of candidate chunks includes dropping the second candidate chunk as being unrelated to the second prompt.

16. The non-transitory computer readable medium of claim 14 wherein the instructions are further configured to cause the processor to perform:
    identifying a plurality of pathways in a knowledge graph to the plurality of candidate chunks using the chunk node, wherein the plurality of candidate chunks contains similar information.

17. The non-transitory computer readable medium of claim 16 identifying the plurality of candidate chunks includes applying a cosine similarity analysis to the first prompt.

18. The non-transitory computer readable medium of claim 16 wherein the instructions are further configured to cause the processor to perform:
    determining at least one topic associated with the plurality of candidate chunks; and
    providing the at least one topic to the LLM arrangement, wherein generating the query includes processing the at least one topic and the plurality of candidate chunks using the LLM arrangement.

19. The non-transitory computer readable medium of claim 16 wherein the instructions are further configured to cause the processor to perform:
  providing the first candidate chunk to the LLM arrangement; and
  generating the response using the LLM arrangement.

20. The non-transitory computer readable medium of claim 19 wherein the interface is a chatbot interface, and wherein the system includes a document chunking arrangement that is configured to ingest the documents and to create the plurality of candidate chunks.

* * * * *